US007957920B2

(12) United States Patent
Innings et al.

(10) Patent No.: US 7,957,920 B2
(45) Date of Patent: Jun. 7, 2011

(54) MILKING MACHINE TESTING

(75) Inventors: Lars Innings, Hagersten (SE); David Crook, Swansea (GB)

(73) Assignee: DeLaval Holdings AB, Tumba (SE)

( * ) Notice: Subject to any disclaimer, the term of this patent is extended or adjusted under 35 U.S.C. 154(b) by 241 days.

(21) Appl. No.: 12/278,732

(22) PCT Filed: Oct. 2, 2006

(86) PCT No.: PCT/SE2006/050365
§ 371 (c)(1),
(2), (4) Date: Aug. 7, 2008

(87) PCT Pub. No.: WO2007/100280
PCT Pub. Date: Sep. 7, 2007

(65) Prior Publication Data
US 2009/0177418 A1 Jul. 9, 2009

(30) Foreign Application Priority Data

Mar. 1, 2006 (SE) ...................................... 0600450

(51) Int. Cl.
*G01F 17/00* (2006.01)

(52) U.S. Cl. ......................................................... 702/51

(58) Field of Classification Search ...................... 702/51
See application file for complete search history.

(56) References Cited

U.S. PATENT DOCUMENTS

| 4,616,215 A | 10/1986 | Maddalena |
| 5,769,025 A * | 6/1998 | van der Lely et al. ..... 119/14.42 |
| 2004/0168647 A1 | 9/2004 | Brown et al. |

FOREIGN PATENT DOCUMENTS

| EP | 0442383 B1 | 9/1993 |
| EP | 0576086 B1 | 8/1998 |
| EP | 0951822 A2 | 10/1999 |
| EP | 1212936 A2 | 6/2002 |
| EP | 1245150 A1 | 10/2002 |
| SE | 512213 C2 | 2/2000 |

\* cited by examiner

*Primary Examiner* — Drew A Dunn
*Assistant Examiner* — Stephen J Cherry
(74) *Attorney, Agent, or Firm* — Hovey Williams LLP

(57) ABSTRACT

The invention relates to dynamic/wet testing of a milking machine (i.e. during extraction of milk from at least one animal). A proposed testing arrangement includes a number of sensors ($1_{11}$, $1_{12}$, $1_{13}$, $1_{14}$, $1_{21}$, $1_{22}$, $1_{23}$, $1_{24}$, 2, $2_1$, $2_2$, $2_3$, $2_4$, 3, $3_1$, $3_2$, $3_3$, $3_4$, 4, $4_1$, $4_2$, $4_3$, $4_4$, 5, 6), which are adapted to register a vacuum pressure at a respective test point in at least one fluid conduit of the milking machine. An analysis unit (A) of the testing arrangement determines at least one pressure difference between the vacuum pressures registered in at least two of the test points being positioned on a respective side of at least one component in the milking machine with respect to a fluid flow through the at least one component to establish a vacuum drop over this component. The unit (A) compares the vacuum drop with a threshold value to conclude whether or not a test condition is fulfilled. A notification is generated with respect to any component for which the condition not is fulfilled. Thus, for instance an appropriate corrective action can be carried out.

22 Claims, 4 Drawing Sheets

MILKING MACHINE TESTING

THE BACKGROUND OF THE INVENTION AND PRIOR ART

The present invention relates generally to machine milking of animals. More particularly the invention relates to a testing arrangement for a milking machine, a milking machine, a method of testing a milking machine, a computer program directly loaded into the internal memory of a computer for carrying out the method, and a computer readable medium having a computer program recorded thereon for carrying out the method.

Automatic milking solutions are becoming increasingly efficient and sophisticated. Of course, this is a desirable. However, the technical development has also lead to that the milking machines have become relatively complex, and thus difficult to test and monitor. Static-mode procedures, i.e. dry testing performed when no milk is extracted, have been known for decades. An important drawback of these procedures is that they are incapable of encountering any problems that only arise in the presence of milk. Since the large amounts of milk that normally are present in the machine when it operates in the working mode highly influence the milking machine's workload, the dry testing can exclusively provide general status indications for the machine.

Therefore, various forms of alternative test procedures have been developed to better reflect the conditions experienced by the milked animals. U.S. Pat. No. 6,705,247 describes a method for testing animals being milked by means of a system, which in turn, includes a plurality of milk meters. Here, a remote control device provides a single interface with all milk meters for inputting and receiving of data. The recorded measurement data may serve as a basis for determining various animal related parameters.

WO00/75610 discloses a solution for monitoring a vacuum supply pulsator device during milking. Here, a signal describing a varying position of a flexible diaphragm is used to determine different kinds of malfunctions in the milking line and the teat cups, for instance being caused by a small leakage or dirt.

In general, so-called wet (or dynamic) testing, which is performed on a milking machine in the working mode offers a much more accurate diagnosis means than the above-mentioned dry testing. In wet testing, the influence of different amounts of milk and milk flow rates can be determined. Thus, an overall plant performance in the working mode is provided. De Koning, K. et al., "Dynamic Testing, Measuring during Milking—Procedures and Interpretation", English translation of chapter 5 in "The Dutch Guide Line for Testing of Milking Machines", IKC-report nr. 19, Handleiding voor het doormeten van Melkinstallaties, 1991 discloses one example of a method for measuring variations in milking vacuum during actual milking.

Nevertheless, this type of dynamic testing does not provide a sufficient diagnosis accuracy to conclude which specific component, if any, in the milking machine that malfunctions. Hence, it is also difficult to perform adequate corrective modifications and/or adjustments of the milking machine, and the animals risk being subjected to unhealthy vacuum pressures, e.g. resulting in over or under milking.

SUMMARY OF THE INVENTION

The object of the present invention is therefore to alleviate the problem above and thus to provide an improved dynamic testing approach in respect of a milking machine.

According to one aspect of the invention, the object is achieved by the initially described arrangement, wherein the analysis unit is adapted to determine at least one pressure difference between the vacuum pressures registered in at least two of the test points being positioned on a respective side of at least one component in the milking machine with respect to a fluid flow through the at least one component in order to establish a vacuum drop over the at least one component. The analysis unit is further adapted to compare the vacuum drop with a threshold value to conclude whether or not a test condition is fulfilled. If the test condition is found not to be fulfilled, the analysis unit is adapted to generate a notification with respect to the at least one component for which the condition not is fulfilled.

An important advantage attained by this arrangement is that any specific weaknesses of the milking unit's most vital components can be identified with high accuracy, both with respect to the location of an error and the type of malfunction, for instance that a particular shut-off valve is leaking, clogged or by other means is faulty. As a further result, adequate corrective measures may be proposed automatically.

Moreover, depending on whether a repeated/continuous monitoring or an occasional diagnosing is desired, the testing arrangement may either be integrated into the milking machine (i.e. constitute a permanent part thereof), or be temporarily connected to the milking machine.

According to one preferred embodiment of this aspect of the invention, the analysis unit is adapted to receive at least one flow related parameter of the milk machine. The at least one parameter is registered by at least one flow meter, which is either an integral part of the milking machine, or a component temporarily attached thereto. Moreover, the analysis unit is adapted to allocate the threshold value in response to the at least one registered parameter. Such adaptation of the threshold values is desirable because it enhances the reliability and accuracy of the testing.

According to another preferred embodiment of this aspect of the invention, at least one first and at least one second test point are adapted to be positioned on a fluid flow up-stream side and a fluid flow down-stream side respectively of at least one of the following components: a shut-off valve in a milk conduit connected to a teat cup, a shut-off valve in a milk conduit connected to a milking claw, a milk hose, a teat cup, a milk flow meter, a receiver tank and a sanitary trap.

It is generally desirable that a teat-cup related test point be located as proximate to the teat as possible, i.e. inside of a teat cup, since thereby a most relevant measurement can be made. Nevertheless, (e.g. temporarily) locating the test point in a so-called short milk conduit to which the teat cup is connected provides a more flexible design. Normally, this is also less problematic with regard to milk hygiene.

According to still another preferred embodiment of this aspect of the invention, the analysis unit is adapted to simultaneously test two or more components of the milking machine. Thereby, an overall efficient testing solution is attained.

According to a further preferred embodiment of this aspect of the invention, the analysis unit includes at least one of the sensors. Each of the sensors included in the analysis unit is adapted to be connected to a particular test point of the at least two of the test points via a respective sensor conduit. This design is advantageous because it considerably simplifies a temporary attachment of the testing arrangement to a milking machine. Namely, the entire arrangement can then be represented by the analysis unit plus a number of sensor conduits (one for each desired test point).

According to another preferred embodiment of this aspect of the invention, the analysis unit is adapted to produce an alarm in response to any notification. Preferably, the analysis unit is also adapted to present information relating to a suggested corrective action to be performed in respect of at least one component for which the test condition not is fulfilled.

According to yet another preferred embodiment of this aspect of the invention, the analysis unit is adapted to produce at least one signal, which is adapted to at least indirectly cause an adjustment of a vacuum pressure level in the milking machine in response to any notification. This means that either the analysis unit itself generates a set of relevant pressure adjustment signals, or the analysis unit orders another unit (e.g. a controller in the milking machine) to generate such signals.

According to still another preferred embodiment of this aspect of the invention, the analysis unit is adapted to generate an affirmative indication if the test condition is fulfilled with respect to each of the at least one threshold value.

According to a further preferred embodiment of this aspect of the invention, the arrangement is adapted to test the milking machine during a milking procedure. This procedure is presumed to include: washing of at least one teat, attachment of at least one teat cup, extraction of milk, and/or removal of teat cups. Hence, virtually the entire procedure carried out by the milking machine can be monitored, and any malfunctions of the machine can be pin pointed.

Furthermore, according to another preferred embodiment of this aspect of the invention, the arrangement is adapted to test the milking machine during cleaning of the milking machine. Consequently, dynamic testing can be carried out also when no milk is extracted. More importantly, the effects of the cleaning as such can be investigated by means of the proposed arrangement.

According to another aspect of the invention, the object is achieved by the initially described milking machine, wherein the milking machine includes the proposed testing arrangement. Naturally, this milking machine is advantageous because its function/operation status can be monitored continuously, and thus the machine's overall efficiency can be made high. Furthermore, the milking-related health risks for the animals can be held low.

According to yet another aspect of the invention, the object is achieved by the initially described method, wherein at least one pressure difference is determined between the vacuum pressures registered in at least two of the test points being positioned on a respective side of at least one component in the milking machine with respect to a fluid flow through the at least one component to establish a vacuum drop over the at least one component. The vacuum drop is compared with a threshold value to conclude whether or not a test condition is fulfilled, and if the condition is not fulfilled. A notification is generated with respect to the at least one component for which the condition not is fulfilled.

The advantages of this method, as well as the preferred embodiments thereof, are apparent from the discussion hereinabove with reference to the proposed testing arrangement.

According to a further aspect of the invention the object is achieved by a computer program product, which is directly loadable into the internal memory of a computer, and includes software for controlling the above proposed method when said program is run on a computer.

According to another aspect of the invention the object is achieved by a computer readable medium, having a program recorded thereon, where the program is to control a computer to perform the above-proposed method.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED
EMBODIMENTS OF THE INVENTION

Figure 1:
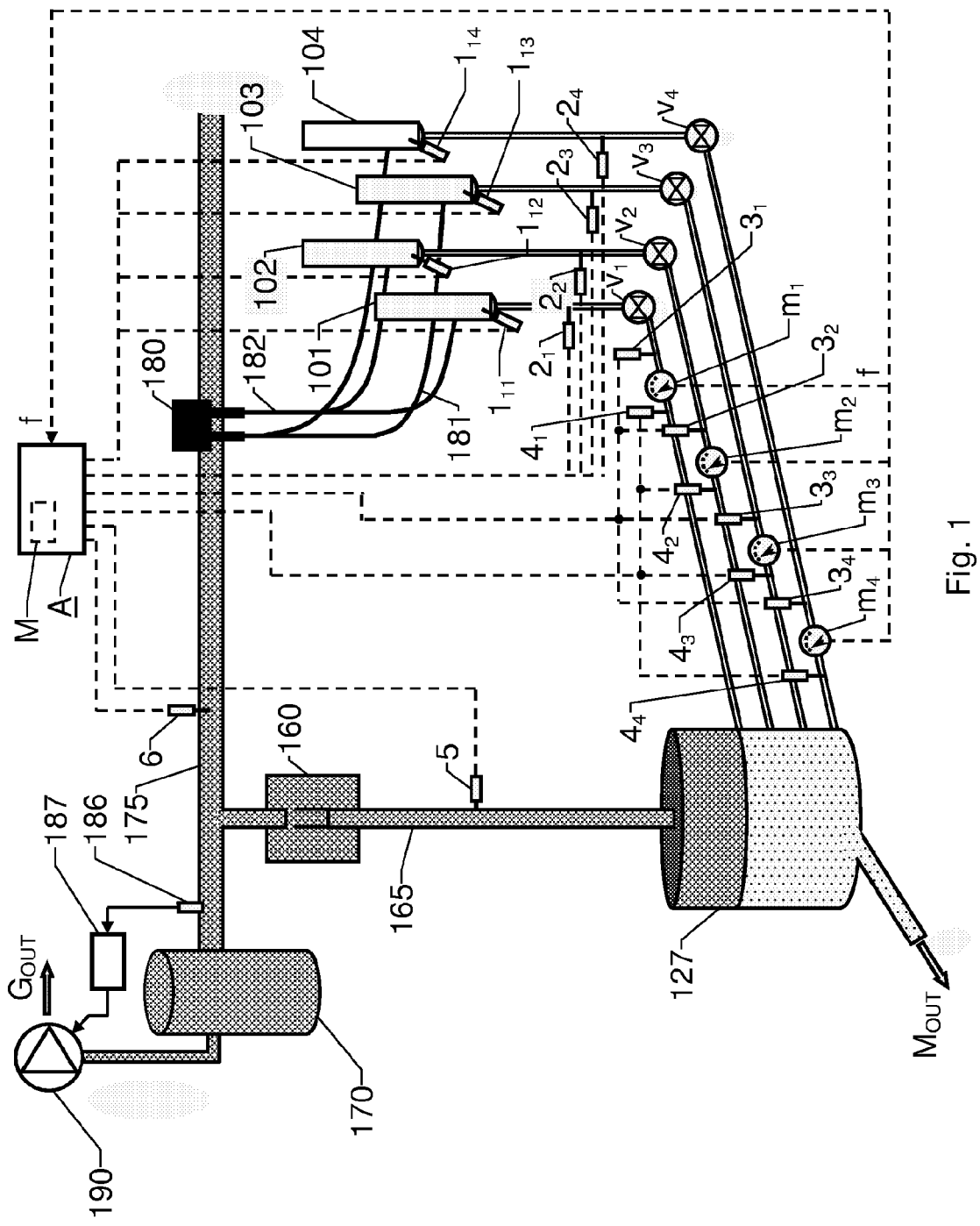
FIG. 1 shows a first type of milking machine, which is configured to be diagnosed by means of a testing arrangement according to a first embodiment of the invention.

We refer initially to FIG. 1, which illustrates a first type of milking machine for milking animals, such as cows. FIG. 1 also shows a testing arrangement according to a first embodiment of the invention, which arrangement is configured to diagnose the milking machine. As mentioned above, the testing arrangement is preferably integrated into the milking machine (i.e. constitute a permanent part thereof), if a repeated/continuous monitoring is desired. If, however, an occasional diagnosing is to be performed, the testing arrangement may instead be temporarily connected to the milking machine.

In any case, we presume that the milking machine includes a milk-transporting conduit wherein four milk hoses connect a respective teat cup 101, 102, 103 and 104 to an end receiver 127, i.e. a local container for receiving milk from one animal. In this embodiment, each teat cup 101, 102, 103 and 104 is individually connected to a pulsation source 180, such as a pulsator, via pulsation conduits 181 and 182. Hence, so-called quarter milking is enabled, which is desirable in automated milking implements, e.g. milking robots. Moreover, each milk hose is provided with a separate shut-off valve $v_1$, $v_2$, $V_3$, $V_4$ and a separate milk flow meter $m_1$, $m_2$, $m_3$, $m_4$.

The end receiver 127, in turn, forwards the milk $M_{OUT}$ to a storage tank (not shown). Normally, the milk also passes via receiver tank (not shown) and one or more additional shut-off valves (not shown) on its way to the storage tank.

A main conduit 175 supplies a vacuum pressure to all vacuum operated units in the milking machine, either directly or indirectly. A pump device 190 accomplishes the vacuum pressure in the main conduit 175. Normally, a buffer vessel 170 and a feed-back loop are connected to the pump device 190 and the conduit 175 to stabilize the pressure at a desired level, say in a range from 30 to 60 kPa. The feedback loop may include a pressure sensor 186 and a control unit 187, which influences the pump device 190 in response to a signal registered by the sensor 186.

The dynamic/wet testing arrangement according to the invention includes a number ($\geq 2$) of sensors $1_{11}$, $1_{12}$, $1_{13}$, $1_{14}$, $2_1$, $2_2$, $2_3$, $2_4$, $3_1$, $3_2$, $3_3$, $3_4$, $4_1$, $4_2$, $4_3$, $4_4$, 5 and 6 and an analysis unit A. Each of the sensors $1_{11}$, $1_{12}$, $1_{13}$, $1_{14}$, $2_1$, $2_2$, $2_3$, $2_4$, $3_1$, $3_2$, $3_3$, $3_4$, $4_1$, $4_2$, $4_3$, $4_4$, 5 and 6 is adapted to register a vacuum pressure at a respective test point in the milking machine. In the embodiment illustrated in FIG. 1, the sensors are distributed over the milking machine to register said pressures locally. However, as will be discussed below with reference to FIG. 3, one or more of the sensors may alternatively be located in the analysis unit A. In any case, at least two test points are defined in at least one fluid conduit of the milking machine, and the sensors are adapted to register a respective vacuum pressure at each of these test points.

The analysis unit A is adapted to determine at least one pressure difference between the vacuum pressures registered in at least two of the test points being positioned on a respective side of at least one component in the milking machine with respect to a fluid flow through this component. The analysis unit A compares the vacuum drop with a threshold value to conclude whether or not a test condition is fulfilled (i.e. whether the tested part of the milking machine operates acceptably). If the test condition not is fulfilled, the analysis unit A is adapted to generate a notification with respect to the at least one component for which the condition is found not to be fulfilled. In response to such a notification, in turn, the analysis unit A may produce an alarm; present information relating to a suggested corrective action to be performed in respect of at least one component for which the test condition not is fulfilled; and/or cause an appropriate adjustment of a vacuum pressure level in the milking machine, for instance in a particular teat cup 101, 102, 103 or 104.

Below follows a few examples of questions and suggested corrective actions, which may be presented to a user as the result of one or more failed test conditions: "Is the milk entry nipple of the minimum size recommended by ISO? If not, please replace the claw with a unit that complies with the ISO recommendations", "Are the liner short milk tube diameters compatible with the milk inlet connections on the claw? If not, please replace the liners with connections that are compatible", "Are the liners and shells used compatible with respect to size and weight? If not, please consult a service technician for appropriate modification advice", "Inspect the claw for improper air leaks, and replace any damaged or worn parts", "Check and replace any damaged rubber tubes on the cluster", "Does the claw meet the minimum recommended size? If not, please replace it", "Check if the claw air is clean", "Check if the cluster is visually clean", and "Are the clusters and the cluster cleaners are compatible? If not, please replace one of them with a compatible ditto."

Nevertheless, if the test condition is found to be fulfilled with respect to all threshold values, the analysis unit A is preferably generates an affirmative indication representing an overall "OK-status".

According to one embodiment of the invention, the threshold values are adaptive. This means that the analysis unit A is adapted to receive at least one milk flow related parameter in respect of at least one animal from which milk is extracted. The milk flow related parameter may be a milk flow rate f registered by any one of the milk flow meters $m_1$, $m_2$, $m_3$ or $m_4$. For reasons of clarity, FIG. 1 symbolizes these milk flow parameters by means of the common symbol f. Here, the milk flow meters $m_1$, $m_2$, $m_3$ and $m_4$ are attached to a respective milk conduit between the teat cups and the end receiver 127. As will be discussed below, alternative milk flow meter configurations are conceivable. In any case, the analysis unit A is preferably adapted to allocate the threshold values in response to the at least one registered parameter f. Hence, a relatively high milk flow rate may for example result in a comparatively high threshold value, and vice versa.

At least one first test point may be positioned, such that a pressure is registered in the respective teat cups 101, 102, 103 and 104. Thus, a specific sensor $1_{11}$, $1_{12}$, $1_{13}$ and $1_{14}$ is arranged at each of the teat cups 101, 102, 103 and 104 respectively. Furthermore, it is presumed that the teat cups are attached to an animal from which milk is extracted.

A respective second sensor $2_1$, $2_2$, $2_3$ and $2_4$ may be arranged at a second test point, which is positioned on a fluid flow up-stream side of a respective shut-off valve $v_1$, $v_2$, $V_3$ and $V_4$ in the milk conduits from the teat cups 101, 102, 103 and 104 respectively. The first and second sensors $1_{11}$, $1_{12}$, $1_{13}$, $1_{14}$ and $2_1$, $2_2$, $2_3$ and $2_4$ deliver their measurement values to the analysis unit A. The analysis unit A is adapted to determine a respective primary pressure difference between each of the at least one first test point and the respective second test point. Based thereon, the analysis unit A concludes whether or not a test condition is fulfilled with respect to at least one of the milk conduits between the teat cups 101, 102, 103 and 104 and the shut-off valves $v_1$, $v_2$, $V_3$ and $V_4$.

A respective third sensor $3_1$, $3_2$, $3_3$ and $3_4$ may be located at a third test point, which is positioned on a fluid down-stream side of each of the shut-off valves $v_1$, $v_2$, $V_3$ and $V_4$. The analysis unit A is adapted to determine a secondary pressure difference between the second and third test points to conclude whether or not a test condition is fulfilled with respect to the shut-off valves $V_1$, $v_2$, $V_3$ and $V_4$. Preferably, the conditions for passing the test depend on the implementation and/or various operation parameters for the milking machine. However a total vacuum drop in the order of 1 kPa over the shut-off valves $v_1$, $v_2$, $V_3$ and $V_4$ is normally acceptable.

The third sensors $3_1$, $3_2$, $3_3$ and $3_4$, in turn, are located on a fluid flow up-stream side of each of the milk flow meters $m_1$, $m_2$, $m_3$ and $m_4$. A respective fourth sensor $4_1$, $4_2$, $4_3$ and $4_4$ may be located at a fourth test point being positioned on a fluid flow down-stream side of side of each of the milk flow meters $m_1$, $m_2$, $m_3$ and $m_4$. Moreover, the analysis unit A is adapted to receive the pressure values registered by the third sensors $3_1$, $3_2$, $3_3$, $3_4$, and the fourth sensors $4_1$, $4_2$, $4_3$, $4_4$ and based thereon determine a tertiary pressure difference between the second test point and the third test point to conclude whether or not a test condition is fulfilled with respect to one or more of the milk flow meters $m_1$, $m_2$, $m_3$ or $m_4$. Again, the conditions for passing the test preferably depends on the implementation and/or various operation parameters. Nevertheless, a pressure drop lower than, or equal to 2 kPa over each milk flow meter is normally acceptable.

Furthermore, a test condition may be applied to the entire milk line from a particular teat cup 101, 102, 103 or 104 to the end receiver 127. For example, at a milk flow rate of 5 liters per minute and a low line implementation (wherein the milk lines are drawn at, or below, a floor level), a vacuum drop of 5 kPa is typically acceptable over the entire milk line. However, in a high line implementation (wherein the milk lines are drawn above the animals) a vacuum drop of 15 kPa is typically acceptable over this milk line (at a milk flow rate of 5 liters per minute).

A fifth sensor 5 may be located at a fifth test point, which is positioned on a vacuum conduit 165 between the end receiver 127 and the main vacuum conduit 175. The analysis unit A is adapted to receive also the pressure value registered by the fifth sensor 5 and determine a quaternary pressure difference between at least one of the fourth test points and the fifth test point to conclude whether or not a test condition is fulfilled with respect to the end receiver tank. During milking, essentially no pressure drop at all is acceptable over the end receiver 127. Thus, the test condition may be regarded as fulfilled only if the pressure drop is below 0.5 to 1.0 kPa.

A sanitary trap 160 may be positioned between the fifth test point and the main vacuum conduit 175. A sixth sensor 6 may be located at a sixth test point, which is positioned on the main vacuum conduit 175 to which the sanitary trap 160 is further connected. The analysis unit A is adapted to determine a quinary pressure difference between the fifth test point and the sixth test point to conclude whether or not a test condition is fulfilled with respect to the sanitary trap 160. In similarity with the end receiver 127 only a small vacuum drop over the sanitary trap 160 is generally acceptable, say in the order of 1 kPa.

According to one embodiment of the invention, the analysis unit A includes, or is associated with a computer readable medium M, such as a memory module. The medium M contains a program, which is adapted to make the analysis unit A control the above-proposed procedure.

Furthermore, according to a preferred embodiment of the invention, the testing arrangement is adapted to test the milking machine during all the specific procedures that are normally performed by the milking machine, i.e. washing of teats, attachment of teat cups, extraction of milk, and/or removal of teat cups. Hence, any malfunctions of the milking machine can be pin pointed.

Figure 2:
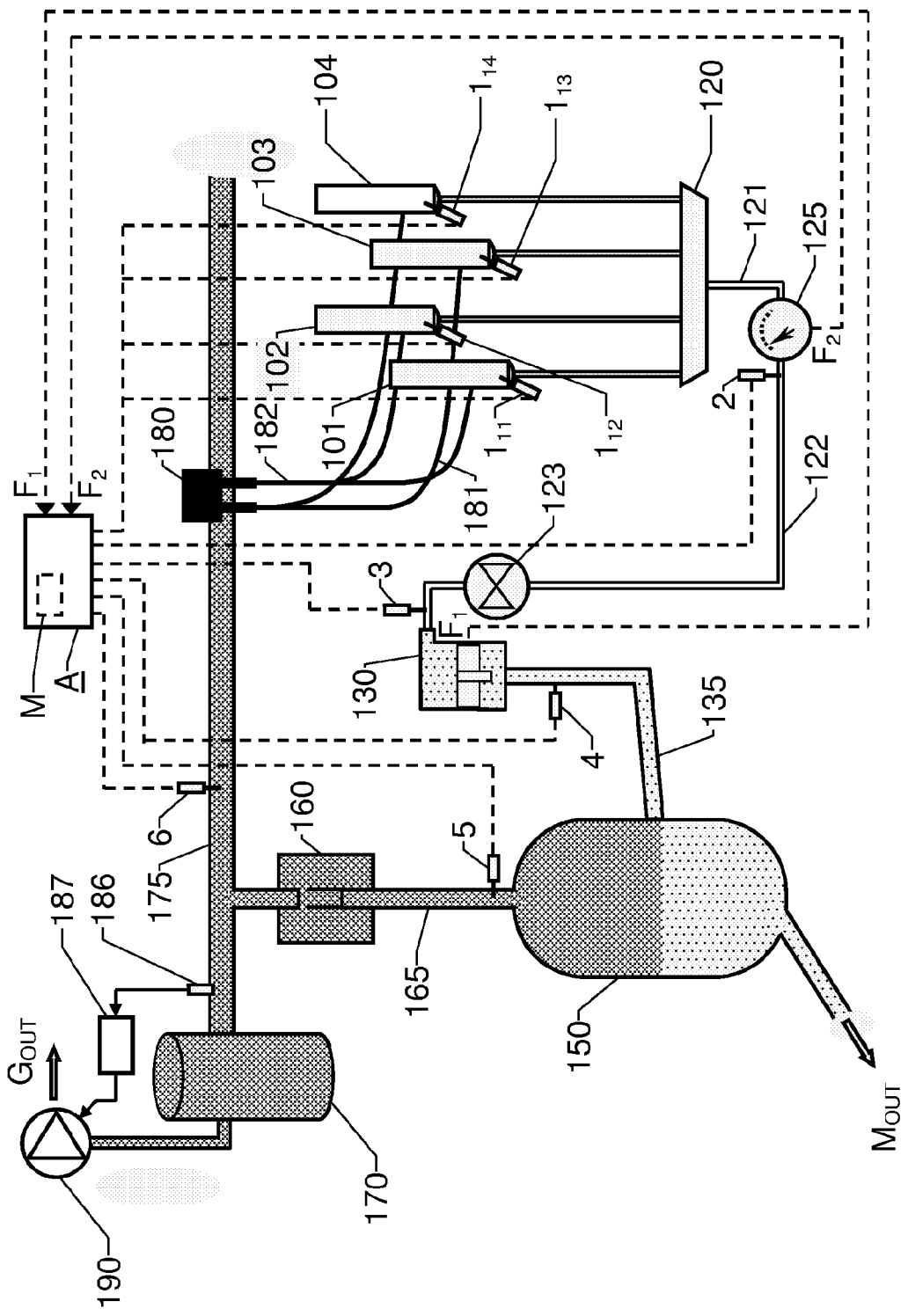
FIG. 2 shows a second type of milking machine, which is configured to be diagnosed by means of a testing arrangement according to a second embodiment of the invention.

FIG. 2 shows a second type of milking machine, which is configured to be monitored, or diagnosed, by means of a testing arrangement according to a second embodiment of the invention. All reference symbols in FIG. 2 being identical to reference symbols occurring also in FIG. 1 represent the same entities as described above with reference to this figure. Nevertheless, these types of milking machines are different in that:

the first type of machine includes individual milk flow meters in the short milk conduits, whereas the second type of machine has a common milk flow meter 130 connected to a milking claw 120 adapted to receive milk from the teat cups; and the second type of machine includes a receiver tank 150 instead of an end receiver.

The receiver tank 150 is typically a common resource for a plurality of milking claws 120, say up to 20, and may have a capacity of 50 liters. After the receiver tank 150, the milk continues $M_{OUT}$ to a storage tank (not shown). Preferably, a shut-off valve 123 is arranged on a milk hose 122 connecting a particular milking claw 120 to the receiver tank 150. Thereby, a discontinuing of the milk flow from the milking claw 120 is enabled.

For testing purposes it may also be advantageous if a milk flow meter 125 of the proposed testing arrangement be arranged to measure the milk delivered from one or more milking claws 120.

The milk flow meter 125 produces a milk flow related parameter $F_2$, which may be used by the analysis unit A to calibrate one or more threshold values for the test conditions. The milk flow meter 130 of the milking machine may deliver a complementary, or alternative, milk flow related parameter $F_1$.

Despite the above-mentioned differences, essentially the same testing is performed in both the first and second types of milking machines. Naturally, in the embodiment of the invention shown in FIG. 2, the primary pressure difference between each of the at least one first test point and the second test point instead establishes a vacuum drop over the milking claw 120 (and any milk flow meter 125). In order to be acceptable, this vacuum drop should normally be less than 1 kPa.

Correspondingly, in the second embodiment of the invention shown in FIG. 2, when determining the tertiary pressure difference between the fourth test point (located in a milk line 135 between the milk flow meter 130 and the receiver tank 150) and the fifth test point, the analysis unit A instead establishes a vacuum drop over the receiver tank 150. Also here, virtually no pressure drop at all is acceptable during milking (i.e. the pressure drop shall be less than 0.5 to 1.0 kPa).

Figure 3:
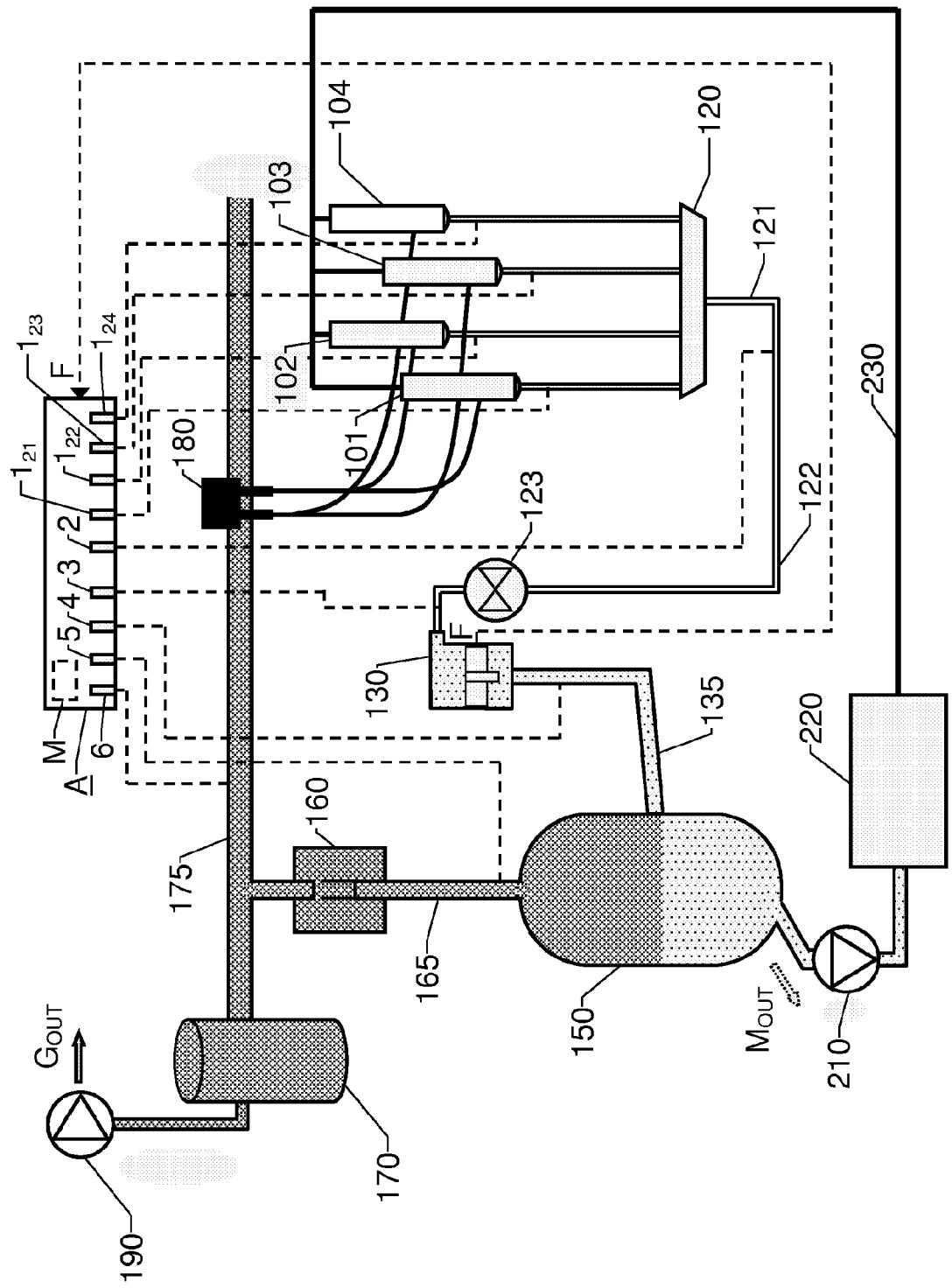
FIG. 3 shows the milking machine of FIG. 2, which is configured to be diagnosed by means of a testing arrangement according to a third embodiment of the invention.

FIG. 3 shows a milking machine of the same type as illustrated in FIG. 2. Thus, all reference symbols in FIG. 3 being identical to those reference symbols occurring also in FIG. 2 represent the same entities as described above with reference to this figure. In order to underline that the feedback loop for the pump device 190 is optional in any one of the embodiments of the present invention, the pressure sensor and the control unit shown in FIGS. 1 and 2 have here been excluded.

In FIG. 3, the testing arrangement is different from the previously described arrangements in that at least one of the sensors $1_{21}$, $1_{22}$, $1_{23}$, $1_{24}$, 2, 3, 4, 5 and 6 (preferably all) is included in, or is at least co-located with, the analysis unit A. Moreover, each sensor in the analysis unit A is adapted to be connected to a particular test point on the milking machine via a respective sensor conduit. A distal end of the sensor conduit is provided with a needle (or equivalent probe means), which upon insertion into a fluid conduit of the milking machine forwards a pressure level in this conduit to the sensor. Thus, the testing arrangement according to this embodiment is highly suitable for diagnosing the milking machine in connection with a single test occasion, or at multiple test occasions being relatively separated in time, because after the/each test occasion, the unit A and its sensor conduits can easily be detached from the milking machine.

To further facilitate the attachment to and the detachment from the milking machine, the at least one first test point is preferably adapted to be positioned in a respective short milk conduit from a teat cup 101, 102, 103 and 104 (instead of inside the teat cups as shown in FIGS. 1 and 2). Analogous to the above description, a wet test is performed, i.e. the pressure is registered at the at least one first test point during extraction of milk from an animal being attached to the teat cups 101, 102, 103 and 104.

Specifically, FIG. 3 shows the milking machine when it is being subjected to a cleaning procedure. Hence, instead of delivering milk out $M_{OUT}$ from the receiver tank 150, a pump means 210 is connected. The pump means 210 is further connected to a cleaning fluid container 220, which in turn, is configured to deliver a cleaning fluid to each of the teat cups 101, 102, 104 and 104 respectively via at least one cleaning hose 230. The effect of this configuration is that the cleaning fluid passes through all components and passageways of the milking machine where milk passes during milking. Naturally, for efficiency reasons, it is desirable to enable testing of the milking machine also when cleaning the milking machine.

Another advantage attained by testing the milking machine during cleaning thereof is that the effects of the cleaning as such can be investigated by means of the testing arrangement. Namely, for example the milk flow meter 130 and/or a first set of sensors $1_{21}$, $1_{22}$, $1_{23}$ and $1_{24}$ can be detect whether or not a sufficient amount of cleaning fluid passes a particular component, say a teat cup. This type of testing is particularly desirable wherein the cleaning fluid container 220 is arranged to supply cleaning fluid to a plurality of milking points, and therefore a manual inspection of the cleaning is rendered intricate. Moreover, a corresponding cleaning configuration in respect of the milking machine shown in FIG. 1 is advantageous in that, here, the milk flow meters $m_1$, $m_2$, $m_3$ and $m_4$ enable a verification of the cleaning of each individual teat cup 101, 102, 103 and 104 respectively.

Figure 4:
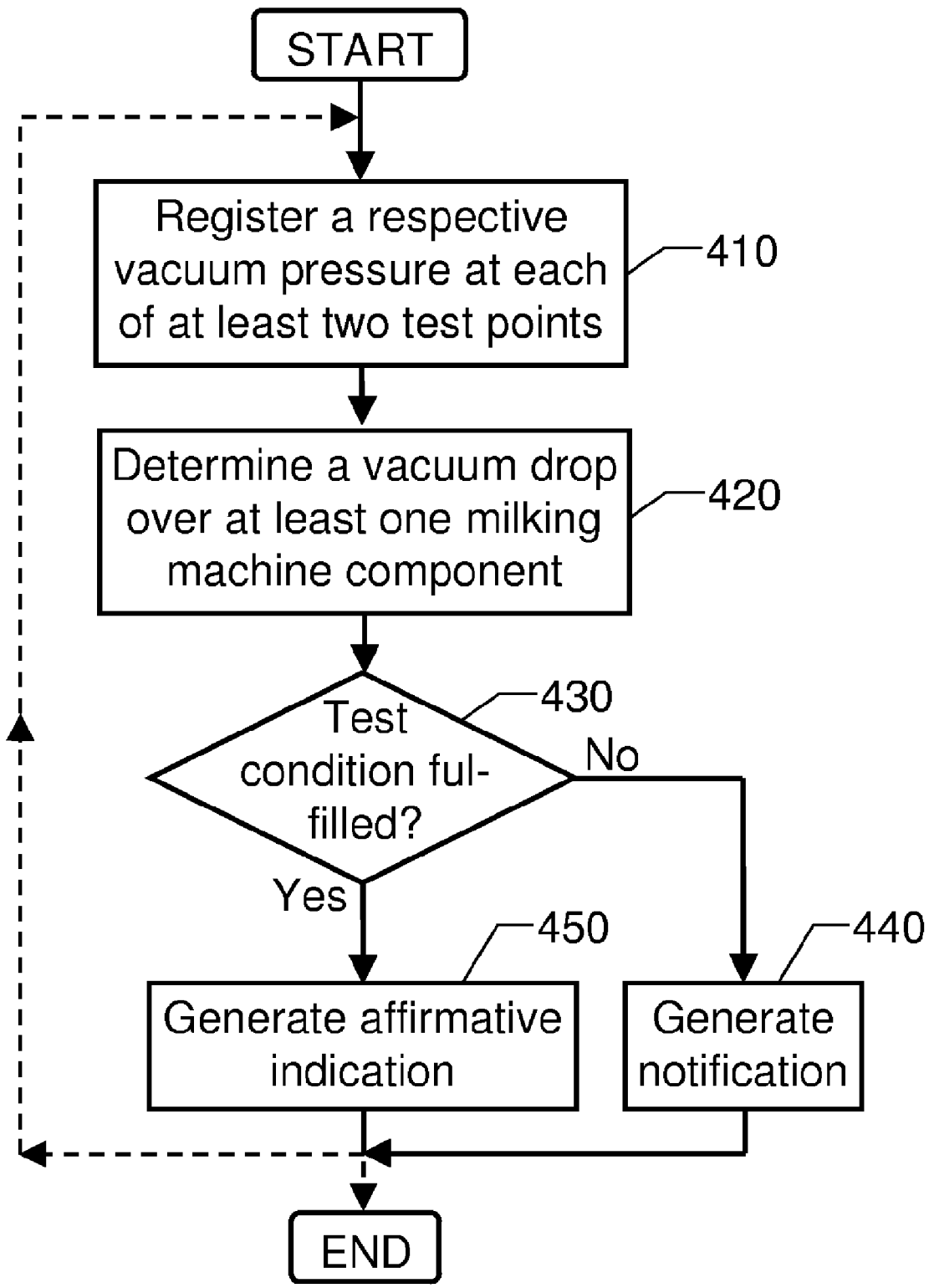
FIG. 4 illustrates, by means of a flow diagram, a general method of controlling a computer apparatus to perform the proposed testing procedure.

To sum up, the general method of controlling a computer apparatus to perform a testing procedure according to the invention will now be described with reference to the flow diagram in FIG. 4.

A first step 410 registers a respective vacuum pressure at each of at least two points being positioned on a respective side of at least one component in the milking machine with respect to a fluid flow through the at least one component. Then, a step 420 determines at least one pressure difference between the vacuum pressures registered in the at least two test points to establish a vacuum drop over the at least one component. A subsequent step 430 investigates whether or not a test condition is fulfilled with respect to the pressure drop over each of the at least one component. If the test condition is found not to be fulfilled, a step 440 follows. Otherwise, a step 450 may follow.

The step 440 generates a notification with respect to the at least one component, which failed to meet the test condition. Based on the notification, in turn, an alarm may be produced and/or a vacuum pressure level in the milking machine may be adjusted. After the step 440, the procedure either ends, or loops back to the step 410 for a continued monitoring/testing.

The step 450 is optional, which means that it may imply one of the following actions: (i) end of procedure, (ii) a direct loop back to the step 410, or (iii) generation of an affirmative indication representing an overall "OK-status" for the milking machine.

All of the process steps, as well as any sub-sequence of steps, described with reference to the FIG. 4 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention primarily is intended to be utilized in connection with cow milking, the invention is equally well adapted for testing milking machines for any other kind of mammals, such as goats, sheep or buffaloes.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia.

The invention is not restricted to the described embodiments in the figures, but may be varied freely within the scope of the claims.

The invention claimed is:

1. An arrangement for testing a milking machine, the arrangement comprising:
   a number of sensors, each sensor being adapted to register a vacuum pressure at a respective test point in at least one fluid conduit of the milking machine; and
   an analysis unit adapted to compare the registered vacuum pressures with a set of threshold values, and based thereon determine whether or not the milking machine operates acceptably, wherein the analysis unit is adapted to:
      determine at least one pressure difference between the vacuum pressures registered in at least two of the test points being positioned on a respective side of at least one component in the milking machine with respect to a fluid flow through the at least one component to establish a vacuum drop over the at least one component,
      compare the vacuum drop with a threshold value to conclude whether or not a test condition is fulfilled, and
      if the condition is not fulfilled, generate a notification with respect to the at least one component for which the test condition not is fulfilled,
   wherein at least one first and at least one second test point of the at least two test points are adapted to be positioned on a fluid flow up-stream side and a fluid flow downstream side respectively of at least one of:
      a shut-off valve in a milk conduit connected to a teat cup,
      a shut-off valve in a milk conduit connected to a milking claw,
      a milk hose,
      a teat cup,
      a milk flow meter,
      a receiver tank, and
      a sanitary trap.

2. The arrangement according to claim 1, wherein the analysis unit is adapted to:
   receive at least one milk flow related parameter of the milking machine, the at least one parameter being registered by at least one flow meter, and allocate the threshold value in response to the at least one registered parameter.

3. The arrangement according to claim 1, wherein the analysis unit is adapted to simultaneously test two or more components of the milking machine.

4. The arrangement according to claim 1, wherein the analysis unit includes at least one of the sensors, the at least one of the sensors included in the analysis unit being adapted to be connected to a particular test point of the at least two of the test points via a respective sensor conduit.

5. The arrangement according to claim 1, wherein the analysis unit is adapted to produce an alarm in response to any notification.

6. The arrangement according to claim 5, wherein the analysis unit is adapted to present information relating to a suggested corrective action to be performed in respect of at least one component for which the test condition not is fulfilled.

7. The arrangement according to claim 1, wherein the analysis unit is adapted to produce at least one signal which is adapted to at least indirectly cause an adjustment of a vacuum pressure level in the milking machine in response to any notification.

8. The arrangement according to claim 1, wherein the analysis unit is adapted to generate an affirmative indication if the test condition is fulfilled with respect to each of the at least one threshold value.

9. The arrangement according to claim 1, wherein the arrangement is adapted to test the milking machine during a milking procedure, the milking procedure including at least one of:
washing of at least one teat,
attachment of at least one teat cup,
extraction of milk, and
removal of teat cups.

10. The arrangement according to claim 1, wherein the arrangement is adapted to test the milking machine during cleaning of the milking machine.

11. A milking machine adapted to automatically extract milk from at least one animal, wherein the milking machine comprises the arrangement according to claim 1.

12. A method of testing a milking machine, the method comprising:
registering a respective vacuum pressure at each of a number of test points in at least one fluid conduit of the milking machine;
comparing the registered vacuum pressures with a set of threshold values to determine whether or not the milking machine operates acceptably;
determining at least one pressure difference between the vacuum pressures registered in at least two of the test points being positioned on a respective side of at least one component in the milking machine with respect to a fluid flow through the at least one component to establish a vacuum drop over the at least one component;
comparing the vacuum drop with a threshold value to conclude whether or not a test condition is fulfilled;
if the condition is not fulfilled, generating a notification with respect to the at least one component for which the condition not is fulfilled; and
establishing a vacuum drop over at least one of:
a shut-off valve in a milk conduit connected to a teat cup,
a shut-off valve in a milk conduit connected to a milking claw,
a milk hose,
a teat cup,
a milk flow meter,
a receiver tank, and
a sanitary trap.

13. The method according to claim 12, including the steps of receiving at least one milk flow related parameter of the milking machine, the at least one parameter being registered by at least one flow meter, and allocating the threshold value in response to the at least one registered parameter.

14. The method according to according to claim 12, the method further including the step of simultaneous testing of two or more components of the milking machine.

15. The method according to claim 12, including the step of producing an alarm in response to any notification.

16. The method according to claim 15, including the step of presenting information relating to a suggested corrective action to be performed in respect of at least one component for which the test condition not is fulfilled.

17. The method according to claim 12, including the step of producing at least one signal which is adapted to at least indirectly cause an adjustment of a vacuum pressure level in the milking machine in response to any notification.

18. The method according to claim 12, including the step of generating an affirmative indication if the test condition is fulfilled with respect to each of the at least one threshold value.

19. The method according to claim 12, including the step of testing the milking machine during a milking procedure, the milking procedure including at least one of:
washing of at least one teat,
attachment of at least one teat cup,
extraction of milk, and
removal of teat cups.

20. The method according to claim 12, including the step of testing the milking machine during cleaning of the milking machine.

21. A computer having a computer program product directly loaded into the internal memory of a computer, said computer program comprising software for controlling the steps of claim 12 when said program is run on the computer.

22. A non-transitory computer readable medium having a program recorded thereon, where the program is operable to make a computer control the steps of claim 12.

* * * * *